United States Patent
Le et al.

(10) Patent No.: US 11,907,334 B2
(45) Date of Patent: Feb. 20, 2024

(54) NEURAL NETWORK NEGATIVE RULE EXTRACTION

(71) Applicant: International Business Machines Corporation, Armonk, NY (US)

(72) Inventors: Franck Vinh Le, West Palm Beach, FL (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 17/115,610

(22) Filed: Dec. 8, 2020

(65) Prior Publication Data

US 2022/0180124 A1 Jun. 9, 2022

(51) Int. Cl.
*G06F 18/214* (2023.01)
*G06N 3/08* (2023.01)
*G06N 5/025* (2023.01)

(52) U.S. Cl.
CPC ........... *G06F 18/2148* (2023.01); *G06N 3/08* (2013.01); *G06N 5/025* (2013.01)

(58) Field of Classification Search
CPC ... G06F 18/2148; G06F 18/2411; G06N 3/08; G06N 5/025; G06N 3/02
See application file for complete search history.

(56) References Cited

U.S. PATENT DOCUMENTS

| | | | |
|---|---|---|---|
| 9,792,492 B2 | 10/2017 | Soldevila | |
| 10,521,718 B1 | 12/2019 | Szegedy | |
| 10,546,242 B2 | 1/2020 | Jain | |
| 11,195,120 B2* | 12/2021 | Anderson | H04L 63/1441 |
| 11,373,424 B1* | 6/2022 | Fleming | G06V 30/19147 |
| 11,379,665 B1* | 7/2022 | Edmund | G06N 3/08 |
| 2015/0379427 A1* | 12/2015 | Dirac | G06N 20/00 706/12 |
| 2015/0379429 A1* | 12/2015 | Lee | G09B 5/00 706/11 |
| 2019/0138896 A1 | 5/2019 | Deng | |
| 2019/0188562 A1 | 6/2019 | Edwards | |
| 2019/0238568 A1 | 8/2019 | Goswami | |
| 2019/0318099 A1* | 10/2019 | Carvalho | G06N 3/08 |
| 2019/0370683 A1 | 12/2019 | Metzen | |
| 2020/0019699 A1 | 1/2020 | Araujo | |
| 2020/0026996 A1* | 1/2020 | Kolter | G06N 3/047 |
| 2020/0104678 A1 | 4/2020 | Nixon | |
| 2020/0134468 A1 | 4/2020 | Ding | |

(Continued)

OTHER PUBLICATIONS

Bochereau et al., "Extraction of Semantic Features and Logical Rules from a Multilayer Neural Network," Proceedings of the 1990 International Joint Conference on Neural Network (1990 IJCNN), vol. 2, pp. 579-582. <https://apps.dtic.mil/dtic/tr/fulltext/u2/a247214.pdf>.

(Continued)

*Primary Examiner* — Qun Shen
(74) *Attorney, Agent, or Firm* — Donald J. O'Brien

(57) ABSTRACT

A first classification is received from a neural network regarding a training dataset sent to the neural network. A modified training dataset with a perturbation of the training dataset is identified, where this modified training dataset causes the neural network to return a second classification. The perturbation is analyzed to identify a negative rule of the neural network.

20 Claims, 3 Drawing Sheets

(56) References Cited

U.S. PATENT DOCUMENTS

| | | | |
|---|---|---|---|
| 2020/0210575 A1* | 7/2020 | Huang | G06N 20/00 |
| 2020/0226425 A1 | 7/2020 | Zhang | |
| 2020/0364616 A1* | 11/2020 | Wong | G06N 20/00 |
| 2021/0089957 A1* | 3/2021 | Ermans | G06N 3/045 |
| 2021/0125005 A1* | 4/2021 | Kuta | G06F 21/577 |

OTHER PUBLICATIONS

Alzantot et al., "GenAttack: Practical Black-box Attacks with Gradient-Free Optimization," In Proceedings of the Genetic and Evolutionary Computation Conference (GECCO '19), Association for Computing Machinery, Jul. 1, 2019, 9 pages.

Ancona et al., "Towards Better Understanding of Gradient-Based Attribution Methods for Deep Neural Networks," ICLR 2018, Mar. 7, 2018, 16 pages.

Andrews et al., "Survey and critique of techniques for extracting rules from trained artificial neural networks," Knowledge-Based Systems 6(6), Nov. 1995, pp. 373-389.

Balda et al., "Perturbation Analysis of Learning Algorithms: A Unifying Perspective on Generation of Adversarial Examples," arXiv:1812.07385v1, Dec. 19, 2018, 22 pages.

Craven et al., "Using Sampling and Queries to Extract Rules from Trained Neural Networks," Proceedings of the Eleventh International Conference on Machine Learning, Jul. 10-13, 1994, pp. 37-45. <http://pages.cs.wisc.edu/~shavlik/abstracts/craven.mlc94.abstract.html>.

Fu, "Rule Learning by Searching on Adapted Nets," Proceedings of the ninth National conference on Artificial Intelligence (AAAI'91), vol. 2, Jul. 1991, pp. 590-595.

Goodfellow et al., "Explaining and Harnessing Adversarial Examples," ICLR 2015, arXiv:1412.6572v3, Mar. 20, 2015, 11 pages.

Gulshad et al., "Explaining with Counter Visual Attributes and Examples," arXiv:2001.09671v1, Jan. 27, 2020, 9 pages.

Murdoch et al., "Automatic Rule Extraction from Long Short Term Memory Networks," ICLR 2017, arXiv:1702.02540v2, Feb. 24, 2017, 12 pages.

Ribeiro et al., ""Why Should I Trust You?": Explaining the Predictions of Any Classifier," Proceedings of the 22nd ACM SIGKDD International Conference on Knowledge Discovery and Data Mining (KDD '16), Aug. 2016, pp. 1135-1144. <https://doi.org/10.1145/2939672.2939778>.

Saito et al., "Medical diagnostic expert system based on PDP model," IEEE 1988 International Conference on Neural Networks, Jul. 24-27, 1988, pp. 255-262.

Thrun, "Extracting provably correct rules from artificial neural networks," Technical Report IAI-TR-93-5, Institut for InformatikIII Universitat Bonn, Germany (1994), 3 pages.

Towell et al., "The Extraction of Refined Rules from Knowledge-Based Neural Networks," Machine Learning Research Group Working Paper 91-4, Aug. 1991, 35 pages.

Yuan et al., "Adversarial Examples : Attacks and Defenses for Deep Learning," arXiv:1712.07107v3, Jul. 7, 2018, 20 pages.

Zhou et al., "Transferable Adversarial Perturbations," ECCV 2018, 2018, 16 pages.

* cited by examiner

NEURAL NETWORK NEGATIVE RULE EXTRACTION

BACKGROUND

One increasingly common technique within artificial intelligence (AI) includes the use of neural networks, in which a group of artificial neurons or nodes can "learn" over time. For example, a neural network learns via connections between nodes that can be weighted positively or negatively to incite or depress respective connections. These nodes may stretch across numerous computational layers of the neural network, where these layers are referred to as one or more "hidden layers," as these layers do not directly receive inputs to or provide outputs from the neural network, but rather are "private" to the neural network. For example, the neural network may receive an input of structured and/or unstructured data via an input layer of the neural network, analyze this data according to these weighted connections within the one or more hidden layers, and then output, e.g., a classification of the data via an output layer of the neural network. The neural network may receive feedback when a classification is correct, partially correct, or incorrect and therein use this feedback to reinforce and/or modify what is within these hidden layers. Through this modification, a neural network may improve upon what is "learned" over time by the structure within these hidden layers. The neural network may autonomously execute all operations relating to updating individual nodes/connections/weights within the hidden layers in response to this feedback, including, e.g., adding nodes, weights, and/or connections.

Often a neural network is "trained" by a human expert that will give the neural network increasingly complex inputs across a variety of topics to help the neural network learn how to classify the inputs, including by providing respective feedback to the neural network depending upon how well the neural network is classifying the inputs. The expert may continue training the neural network until the neural network is reliably and repeatedly accurate enough to be used in a real (e.g., production) environment. Part of such an evaluation may include attempting to identify the logical rules that the neural network has functionally generated to classify data. For example, prior to letting a neural network be in a customer-facing situation where the neural network receives input from the customer and provides answers (e.g., classifications) directly to the customer, the expert may wish to discern a set of rules that the neural network uses to classify data in order to verify that these rules are correct and sufficiently robust to handle all predicted queries from the customer. Once the expert gathers these sets of rules, the expert may determine that the neural network is ready for production, or, e.g., conduct some targeted training of the neural network to fix any identified gaps in these rules.

However, it may be difficult and/or impossible for the expert to identify the rules by, e.g., examining the hidden layer(s) of the neural network. As such, the experts may attempt to identify what the rules are by decomposing the specific logic of how the neural network classifies various inputs (e.g., with a series of conditional rules such as "if-then-else" rules, logical loops such as "while" loops, or other logical structures that attempt to capture some or all of the structure within the neural network). While these decompositional techniques may be relatively successful for simple neural networks with only one or two hidden layers, these techniques may suffer substantially with more complex neural networks that have more than two hidden layers.

As such, some experts may attempt to identify the rules of a neural network by various "pedagogical" techniques that treat the neural network as a black box, such that there is no attempt to identify the actual structure of the neural network. While these pedagogical techniques can be effective at identifying rules of relatively stable sets of inputs (e.g., inputs that do not change dramatically), these techniques tend to be computationally expensive (e.g., such that they require a lot of processing power and/or computer memory to run effectively), and further can produce unstable (e.g., fully or partially contradictory) sets of rules when the inputs change notably. The instability and expensive nature of pedagogical techniques may be exacerbated for neural networks with numerous (e.g., more than two) hidden layers. As such, one problem within the industry involves a lack of an effective way at identifying the rules of a neural network for relatively large neural networks.

SUMMARY

Aspects of the present disclosure relate to a method, system, and computer program product relating to identifying negative rules of neural networks. For example, the method includes receiving a first classification from a neural network regarding a training dataset sent to the neural network. The method also includes identifying a modified training dataset with a perturbation of the training dataset that causes the neural network to return a second classification. The method also includes analyzing the perturbation to identify a negative rule of the neural network. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
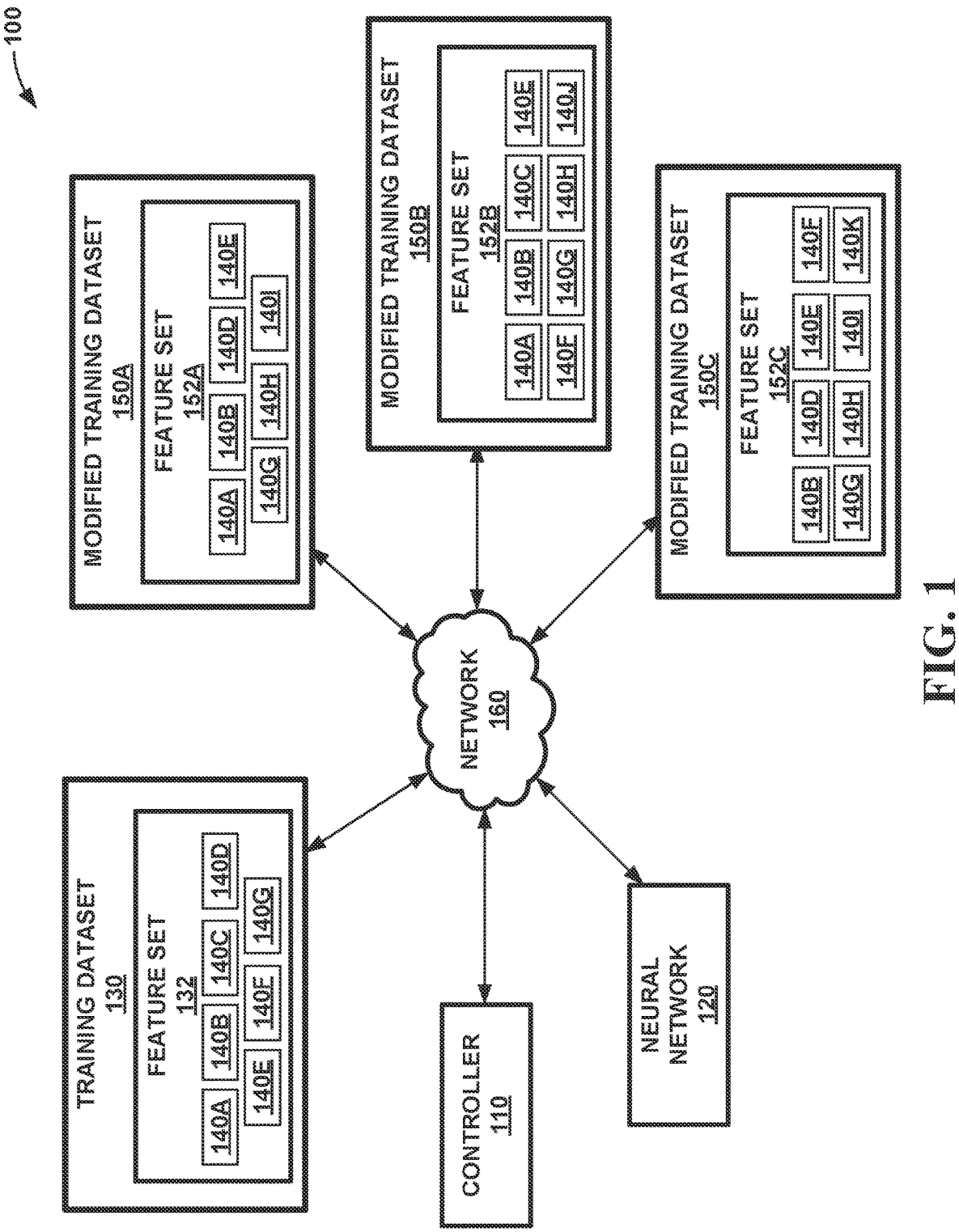
FIG. 1 depicts a conceptual diagram of an example system in which a controller may extract negative rules from a neural network.

Aspects of the present disclosure relate to extracting rules from neural networks, while more particular aspects of the present disclosure relate to extracting negative rules from neural networks using perturbations upon training datasets sent to the neural networks. While the present disclosure is not necessarily limited to such applications, various aspects of the disclosure may be appreciated through a discussion of various examples using this context.

Deep neural networks can achieve very high performance in analyzing data, where this high performance is reflected by high scores in accuracy, recall, precision, F (the harmonic mean of both precision and recall), and the like. For example, each of multilayer perceptron (MLP) neural networks, convolutional neural networks (CNNs), recurrent neural networks (RNNs), long short-term memory (LSTM) neural networks, and the like have been found to have high performance when trained and used appropriately. As is understood by one of ordinary skill in the art, neural networks typically operate as "black boxes" where input is provided to an input layer of the neural network and an output is received from an output layer of the neural network, and the internal logic within the hidden layers of the neural network is difficult or impossible to directly ascertain. As such, despite their high performance, neural networks may not be fully relied upon in some critical applications where, e.g., a single unexpected and objectively incorrect answer provided by this black box would be unacceptable.

There are myriad conventional attempts to try to identify the rules of a neural network. Determining these rules not only helps improve an ability to interpret (and therein account for and/or further train) a neural network, but may also reveal new insights from the data (e.g., by highlighting correlations and/or causations of the data that the neural network had identified that humans had not yet discovered). Some of these conventional attempts are pedagogical as known in the art, therein treating the neural network as a black box in attempting to discern rules from what the black box outputs, while other conventional attempts are decompositional and attempt to analyze relationships between structures of the neural network and the outputs to discern the rules of the neural network. However, decompositional techniques may only be successful for very simple neural networks with one or two hidden layers, and may be ineffective in discerning rules for neural networks with more than two hidden layers. Further, pedagogical techniques tend to be computationally expensive, and further the results from pedagogical techniques can be unstable where the neural network handles robust sets of inputs that vary in a notable manner.

Beyond this, some conventional solutions look to extract rules from more complex neural networks by deriving and tracking single elements of input provided to neural networks and respective outputs. Put differently, these conventional solutions will attempt to track over time which inputs have a positive correlation with respective outputs to identify a "positive rule" where a presence of an input seemingly causes a certain type of output. Identifying these positive correlations over time as a potential rule may result in a dramatic number of "false positives" that need to be ruled out.

Aspects of this disclosure may solve or otherwise address some or all of these problems of conventional systems by identifying negative rules of the neural network. As used herein, a negative rule may include a logical rule that is extracted from a neural network (e.g., a rule that a program identifies the neural network to be using within the hidden layers of the neural network) in which the neural network identifies that an absence of an element within an input increases a likelihood of that input being a first thing (e.g., where the presence of that element would increase a likelihood that the input being a second thing), where the neural network thusly reacts differently as a result of that increased likelihood. A computing device that includes a processing unit executing instructions stored on a memory may provide the functionality that can identify negative rules and therein solve the problems of conventional solutions, this computing device herein referred to as a controller. This controller may be provided by a standalone computing device as predominantly described below for purposes of clarity, though in other examples the controller may be integrated into a neural network management platform.

Conventional solutions may completely lack the ability to identify negative evidence that indicates a negative rule. For example, conventional solutions may lack the ability to identify that negative evidence (e.g., something that is not in an input) may cause a neural network to classify the input as a certain thing via a negative rule of the hidden layers of the neural network. As used herein, negative evidence includes evidence that relates to a lack of a thing in an input causing a neural network to provide a certain type of output, where the rule that governs this being referred to herein as a negative rule. As would be understood by one of ordinary skill in the art, though each given identified rule is helpful, some organizations may require that most (if not all) rules of a neural network are identified prior to deploying a neural networks for these critical applications. As such, being as conventional solutions may be technically incapable of identifying negative rules, it may take an extremely long time to slowly identify all positive correlations in a way such that all rules of a neural network are identified to deploy these neural networks for critical applications.

Conversely, a controller as described herein may be configured to identify two datasets with a smallest change (known in the art as a minimum perturbation) between them that are unexpectedly classified differently by the neural network and analyze elements that are missing (rather than what is present) between the two datasets to identify negative rules. The controller may use an adversarial attack to iteratively change inputs in small ways via perturbations to identify the two datasets with minimum perturbation. For example, one adversarial attack is a fast gradient sign method that creates adversarial examples (e.g., such as images) with slight perturbations. For another example, the controller may use a technique such as a gradient-free optimization technique to generate the minimum perturbation. The controller may focus on those missing elements that are impacted the most by the perturbation, those missing elements that are more relevant to the dataset, or the like, then testing how the neural network responds to these elements being present or missing in subsequent datasets to confirm a rule.

Further, as would be understood by one of ordinary skill in the art, identifying and using negative rules as used by the neural network may improve an ability to use the output from neural network. For example, as described above, conventional solutions may lack the ability to identify negative rules of neural networks, and may therein lack the ability to identify that a neural network accounted for (and made an output based at least in part on) some negative evidence from the input. Instead, conventional solutions may primarily or exclusively use current elements of an input to predict what an output of a neural network will be, and therein learn from a difference between the predicted output and the actual output. As such, conventional solutions may lack an ability to identify an important negative correlation that the neural network has identified (whether correctly or not) between an absence of a thing in an input and a particular output. Aspects of this disclosure relate to a controller interpreting an output from a neural network using this negative rule. Configuring the controller to use negative rules to analyze outputs from a neural network may improve an ability to learn from and utilize neural networks.

For example, consider an example where a neural network has learned to predict who the vendor is of a device using an input dataset of domain name system (DNS) queries that the neural network it receives. A dataset of DNS queries, including to the domain "updates.RouterInc.com" may be sent to the neural network, upon which a neural network trained to predict the vendor of the device returns an output of "Router Inc." (e.g., indicating that the device is provided/supplied by Router Inc.). A conventional solution may see similar results numerous times, and identify a positive rule of the neural network to be "if a device submits a DNS query for updates.InternetOfThingsInc.com, then the vendor is Internet Of Things Inc." However, the neural network may actually have a far more robust set of rules in place that accounts for the facts that, for a number of internet of things (IoT) products (e.g., smart thermostat, smart speakers, etc.), both a product and a mobile device controlling the product (e.g., a cell phone, laptop, etc.) may submit queries to the same domains (e.g., InternetOfThingsInc.com). As such, a conventional solution would have a substantial number of false positives when, e.g., a mobile device is labelled by this inaccurate rule as being an IoT product. Conversely, the controller described herein can identify the negative evidence to extract a rule that states "if a device submits a DNS query for InternetOfThingsInc.com and also does not submit any query to MobileDevice.com, then the vendor is Internet Of Things Inc."

For example, FIG. 1 depicts environment 100 in which controller 110 extracts rules from neural network 120. Controller 110 may include a computing device, such as computing system 200 of FIG. 2 that includes a processor communicatively coupled to a memory that includes instructions that, when executed by the processor, causes controller 110 to execute one or more operations described below. In some examples neural network 120 is stored on a computing device of controller 110, though in other examples neural network may be stored on a separate computing device that is similar to computing system of FIG. 2.

For example, controller 110 may identify that training dataset 130 with a feature set 132 that included features 140A-140G (which, together with features 140H, 140I, 140J, 140K, are collectively referred to herein as "features 140"), when provided to an input layer of neural network 120, causes the neural network to provide a respective output. As discussed herein, neural network 120 may be configured to provides an output of a classification of the respective received data (e.g., such as training dataset 130), though one of ordinary skill in the art would understand that neural networks may be configured to do other things than classify received datasets.

Controller 110 may further generate a set of modified training datasets 150A-150C (collectively, "modified training datasets 150") that each have unique feature sets 152A-152C (collectively, "feature sets 152") of respective features 140. As depicted, each of modified training datasets 150 has some but not all features 140 of training dataset 130, and each includes additional features 140 that were not in training dataset 130. As discussed above, conventional solutions may be able to identify potential positive rules of neural network 120 via positive correlations between features 140 and outputs, but conventional solutions may lack an ability to identify a rule of neural network 120 that causes neural network 120 to classify respective modified training dataset 150 differently as a result of a lack of one or more features 140 of training dataset 130.

In some examples (not depicted), training dataset 130 and/or modified training datasets 150 may be stored on the computing device of controller 110. In other examples, training dataset 130 may be generated by and/or be stored on a separate computing device (e.g., a device similar to computing system 200 of FIG. 2) relative to controller 110. Similarly, in some examples controller 110 may store modified training datasets 150 on other separate computing devices. In such examples, as depicted in FIG. 1 controller 110 may access training dataset 130 and/or modified training datasets 150 over network 160. Network 160 may include a computing network over which computing messages may be sent and/or received. For example, network 160 may include the Internet, a local area network (LAN), a wide area network (WAN), a wireless network such as a wireless LAN (WLAN), or the like. Network 160 may comprise copper transmission cables, optical transmission fibers, wireless transmission, routers, firewalls, switches, gateway computers and/or edge servers. A network adapter card or network interface in each computing/processing device (e.g., controller 110 and/or a computing device of neural network 120, training dataset 130, and/or modified training datasets 150) may receive messages and/or instructions from and/or through network 160 and forward the messages and/or instructions for storage or execution or the like to a respective memory or processor of the respective computing/processing device. Though network 160 is depicted as a single entity in FIG. 1 for purposes of illustration, in other examples network 160 may include a plurality of private and/or public networks.

As used herein, a training dataset such as training dataset 130 and/or modified training datasets 150 may include a set of data such as a document, an audio file, a picture, or the like that is used for the purposes of training neural network 120 and/or identifying rules (such as negative rules) of neural network 120, where such a training dataset is configured and/or structured in a format that neural network 120 is configured to ingest and analyze. Controller 110 may generate modified training datasets 150 with slight perturbations from training dataset 130 such that feature sets 152 are only slightly different than feature set 132. For example, controller 110 may generate modified training datasets 150 with feature sets 152 that include perturbations via an adversarial attack method such as a fast gradient sign method (FGSM), and/or controller 110 may generate modified training datasets 150 with feature sets 152 that include perturbations via a gradient-free optimization technique.

Controller 110 may first identify which of modified training datasets 150 cause neural network 120 to provide a different output than training dataset 130. For example, neural network 120 may provide the exact same classification in response to receiving modified training dataset 150B and training dataset 130, while providing a second classification for both modified training datasets 150A, 150C. Once controller 110 identifies a subset of modified training datasets 150 that caused neural network 120 to provide a different output, controller 110 may identify which of these had a respective feature set 152 with a smaller perturbation from feature set 132 of training dataset 130.

For example, where neural network 120 classifies images, controller 110 may use the FGSM to identify that two different images of modified training datasets 150A, 150C are classified differently than an image of training dataset 130. Controller 110 may then identify that an image of modified training dataset 150A has less pixels changed than an image of modified training dataset 150C relative to an image of training dataset 130, such that the perturbation of modified training dataset 150A is smaller. Alternatively, controller 110 may identify that an image of modified training dataset 150A had less important pixels changed than modified training dataset 150C (e.g., where controller 110 is aware that pixels in a target region of an image are analyzed more closely than pixels outside of this target region). Alternatively, as depicted in FIG. 1, feature set 152A of modified training dataset 150A only included three differences (e.g., not including features 140C, 140F and including extra feature 140I), while feature set 152C of modified training dataset 150C included four difference (e.g., not included features 140A, 140C, and including extra features 140J, 140K), such that there were less differences (and therein a smaller perturbation) between features 140 of modified training dataset 150A and training dataset 130 than there were between features 140 of modified training dataset 150C and training dataset 130.

In response to this determination that modified training dataset 150A returned a different classification and had the smallest identified change from training dataset 130, controller 110 identifies modified training dataset 150A as having the minimal perturbation of all modified training datasets 150. As used herein, "minimal" of minimal perturbation does not necessarily mean the smallest perturbation technically achievable or identifiable, but the smallest perturbation that was identified among a group of generated datasets that was classified differently than training dataset 130. Though only three modified training datasets 150 are depicted in FIG. 1 for purposes of illustration, it is to be understood that in other examples controller 110 may generate a substantial number of modified training datasets 150 (e.g., dozens or hundreds or more modified training datasets 150), where many of these are classified as different things by neural network 120 (and where controller 110 may identify one or more negative rules for each identified minimal perturbation of a different classification). Similarly, it is to be understood that the number of features 140 provided in FIG. 1 is for purposes of example only, and as would be understood by one of ordinary skill in the art controller 110 would be analyzing hundreds or thousands or more of features 140 of different classes and magnitudes.

Once controller 110 identifies modified training dataset 150A with the minimal perturbation, controller 110 analyzes this perturbation to determine if a negative rule can explain the different classification. For example, controller 110 may identify feature 140I of modified training datasets 150A, 140C that were not in feature set 132 of training dataset 130. Once identified, controller 110 may create other modified training datasets 150 with other perturbations that do not include feature 140I to see if that missing feature 140I may reflect a negative rule. For example, as depicted, controller 110 may identify that feature 140H was present in all modified training datasets 150, but given that modified training dataset 150B was classified the same as training dataset 130 that feature 140H does not seem to relate to a negative rule. Controller 110 may verify that this negative rule accounts for both training dataset 130 and modified training datasets 150 to reflect the negative evidence of the system.

Controller 110 may test further rounds of modified training datasets 150 that are perturbations of modified training dataset 150A that all do have feature 140I. As would be understood by one of ordinary skill in the art, if controller 110 identifies with a threshold amount of certainty that absent features 140 cause a classification, controller 110 identifies a negative rule of neural network 120 that reflects this situation.

Alternatively, or additionally, controller 110 may be configured to, e.g., add feature 140I to the instances of dataset 130. Once added, controller 110 may send the updated instance of dataset 130 that includes feature 140I to neural network 120 and verify that this instance is classified differently. If controller 110 detects that the updated instance of dataset 130 is indeed classified differently, controller 110 may determine that the extracted negative rule is confirmed, whereas if the updated instance of dataset 130 is classified identically and/or similarly, controller 110 may determine that the extracted negative rule is disproved (and/or that the extracted negative rule requires more tweaking). Alternatively, or additionally, controller 110 may determine that only some subsequent modified training datasets 150 that include (and/or do not include) a respective feature 150 that has been identified as relating a negative rule are classified as expected by neural network 120, in response to which controller 110 updates the negative rule to account for these determinations. In such ways, once controller 110 determines a possible negative rule by detecting that an absence of one or more features 140 impacts a classification by neural network 120, controller 110 may iterate what features 140 are in subsequent feature sets 152 of subsequent modified training datasets 150 to confirm, refute, modify, perfect or the like the respective negative rule.

As would be understood by one of ordinary skill in the art, in some examples controller 110 may identify a substantial number (e.g., dozens, or hundreds, or thousands) of features 140 of an identified modified training dataset 150 that are not present in training dataset 130. As such, controller 110 may identify a subset of features 140 of training dataset 130 that are not present in training dataset 130 for which to test (e.g., test by looking to confirm if a negative rule regarding this classification exists).

In some examples, controller 110 may identify a subset of features 140 by identifying those features 140 that are the most relevant while are also absent in feature set 132. Controller 110 may specifically determine which of these features 140 is the most relevant to the determination of neural network 120 by, e.g., term frequency-inverse document frequency (tf-idf). For example, where neural network 120 is analyzing a plurality of medical documents, controller 110 may verify how important a given feature 140 of a medical term is to a full corpus of data, such that controller 110 may give identify a missing feature 140 of a medical diagnosis to be more relevant than a missing feature 140 of a patient's name. Alternatively, or additionally, where neural network 120 is analyzing and classifying images, controller 110 may identify different shapes and colors as being more relevant when then are within a target region of an image rather than when they are outside of that target region. Controller 110 may identify those absent features 140 that were most relevant to analyze and investigate for a potential negative rule.

Alternatively, or additionally, controller 110 may identify a subset of features 140 to analyze based on which features 140 were most impacted by the perturbation. In some examples, controller 110 may identify that features 140 that were absent were replaced via the perturbation with replacement features 140, some of which were close to absent features 140 and some of which were very different than absent features 140. In other examples, some datasets that neural network 120 analyzes have predetermined and understood relationships between various features 140, where, e.g., some features 140 are known to cause other features 140 to exist in a certain manner. One example of this is in images, where there are known relationships between light, shadow, and objects of the image. Another example of this is within structured documents of a corpus, where the data of the structured documents tends to follow predictable formats where the existence of some piece of data suggests (or precludes) follow-up data from being provided (e.g., where checking yes on a certain checkbox indicates a high likelihood of an explanation regarding that checkbox in a subsequent field). One of ordinary skill in the art would understand numerous other such examples where the absence of some features 140 to have a predictably greater impact on other features 140. Controller 110 may identify those features 140 that caused the biggest difference as a result of their absence to analyze and investigate for a potential negative rule.

Figure 2:
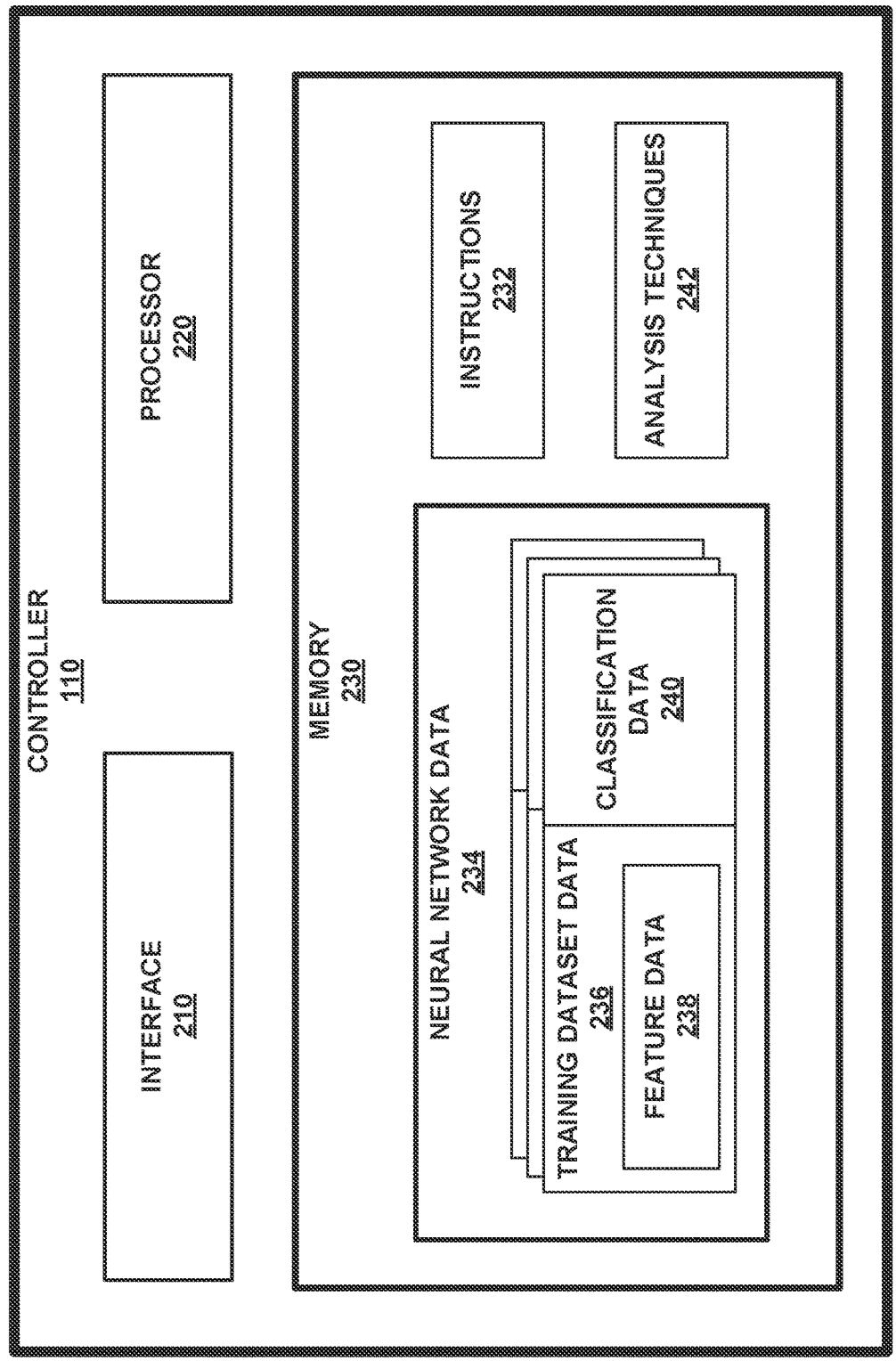
FIG. 2 depicts a conceptual box diagram of example components of the controller of FIG. 1.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with a computing device that stores neural network 120, training dataset 130, modified training datasets 150, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to identify negative rules of neural network 120. Controller 110 may utilize processor 220 to thusly identify negative rules. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to identify negative rules.

Processor 220 may identify negative rules of neural network 120 according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EE-PROM), or the like. In some examples, processor 220 may identify negative rules as described herein according to instructions 232 of one or more applications (e.g., software applications) stored in memory 230 of controller 110.

In addition to instructions 232, in some examples gathered or predetermined data or techniques or the like as used by processor 220 to identify negative rules as described herein may be stored within memory 230. For example, memory 230 may include information described above relating to training dataset 130 and modified training datasets 150. For example, as depicted in FIG. 2, memory 230 may include neural network data 234. Neural network data 234 may include a list of all data that controller 110 is gathering on neural network 120 in order to identify negative rules of neural network 120. Neural network data 234 includes training dataset data 236 on each of training dataset 130 and modified training datasets 150. Training dataset data 236 may include feature data 238, which may include the full list of identified features 140 of the datasets. As depicted, each training dataset data 236 may be associated with classification data 240, which may include the classification that neural network 120 had of the respective dataset.

Memory 230 may further include analysis techniques 242. Analysis techniques 242 may include techniques used by controller 110 to generate (and identify) the minimal perturbation as discussed herein, such as, e.g., FGSM, gradient-free optimization techniques or other techniques known to one of ordinary skill in the art. In some examples, controller 110 may further use various image processing techniques and/or natural language processing techniques to generate perturbations and analyze features as described herein. For example, controller 110 may utilize natural language processing (NLP) techniques including, but are not limited to, semantic similarity, syntactic analysis, and ontological matching. For example, in some embodiments, processor 220 may be configured to analyze features 140 of words as gathered from modified training dataset 150A with the minimal perturbation to determine semantic features (e.g., word meanings, repeated words, keywords, etc.) and/or syntactic features (e.g., word structure, location of semantic features in headings, title, etc.) of this modified training dataset 150A. Ontological matching could be used to map semantic and/or syntactic features to a particular concept. The concept can then be used to determine the topic of a changed portion of modified training dataset 150A. In this same way, controller 110 may identify which features 140 of datasets are more or less different (in order to identify which features 140 to test) using NLP techniques.

Figure 3:
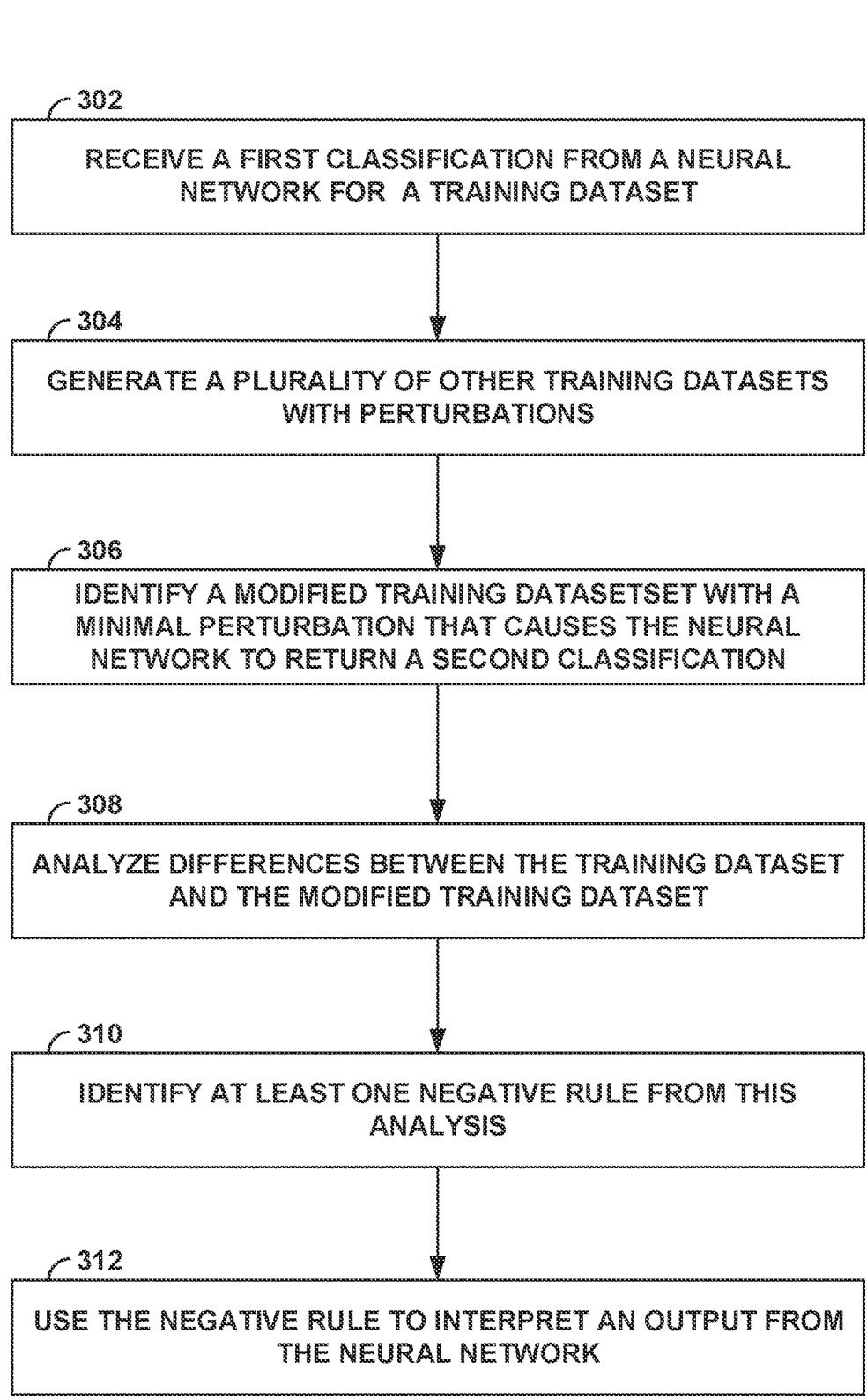
FIG. 3 depicts an example flowchart by which the controller of FIG. 1 may extract negative rules from a neural network While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

Using these components, controller 110 may identify negative rules of neural network 120 as discussed herein. For example, controller 110 may identify negative rules according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 receives a first classification from neural network 120 regarding training dataset 130 sent to neural network 120 (302). Controller 110 generates a plurality of modified training datasets 150 with perturbations (304). Controller 110 may generate these modified training datasets 150 via one or more known adversarial attack methods to ensure that each of these perturbations are relatively similar.

Controller 110 identifies a modified training dataset 150 with a perturbation of training dataset 130 that causes neural network 120 to return a second classification (306). In some embodiments, controller 110 identifies the respective modified training dataset 150 having a minimal perturbation, as discussed above. As discussed herein, controller 110 may identify that modified training dataset 150A has the minimal perturbation while returning a different classification.

Controller 110 analyzes differences between training dataset 130 and the identified modified training dataset 150A having a minimal perturbation (308). Controller 110 may analyze differences between feature set 132 of training dataset 130 and feature set 152A of modified training dataset 150A. Controller 110 may identify one or more features 140 of feature set 152A of modified training dataset 150A that are not in feature set 132 of training dataset 130.

Controller 110 may identify a group of features 140 of modified training dataset 150A that are not in feature set 132 of training dataset 130. In such examples, controller 110 may use one or more techniques to determine that some missing features 140 are more relevant, such as using tf-idf, and therein focus in on these more relevant features 140. In other examples, controller 110 may identify those missing features 140 that were most impacted by the perturbation.

Controller 110 identifies at least one negative rule from the analysis of the perturbation (310). For example, controller 110 may test whether or not missing features 140 as described above cause the second classification by iterating with additional modified training datasets 150 that all include the identified missing features 140. Other examples of identifying the negative rule are also possible.

Controller 110 uses the identified negative rule to interpret an output from neural network 120 (312). For example, controller 110 may identify that, e.g., a new dataset is processed by neural network 120 that includes the identified missing feature 140 and is classified by neural network 120 as the second classification. In response to the negative rule, controller 110 may interpret this classification as correct.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Clause 1: In some examples of this disclosure, a computer-implemented method includes: receiving a first classification from a neural network regarding a training dataset sent to the neural network; identifying a modified training dataset with a perturbation of the training dataset that causes the neural network to return a second classification; and analyzing the perturbation to identify a negative rule of the neural network.

Clause 2: In some examples of the computer-implemented method of clause 1, analyzing the perturbation to identify the negative rule of the neural network includes identifying features that are present in the modified training dataset that are not in the training dataset.

Clause 3: In some examples of the computer-implemented method of clause 2, analyzing the perturbation to identify the negative rule of the neural network includes identifying that some of the features that are not in the training dataset are more relevant to the training dataset.

Clause 4: In some examples of the computer-implemented method of clauses 2 or 3, identifying that some of the features that are not in the training dataset are more relevant includes using term frequency inverse document frequency.

Clause 5: In some examples of the computer-implemented method of any of clauses 1-5, analyzing the perturbation to identify the negative rule of the neural network includes identifying features of the training dataset that were most impacted by the perturbation.

Clause 6: In some examples of the computer-implemented method of any of clauses 1-6, the perturbation is determined using an adversarial attack method.

Clause 7: In some examples of the computer-implemented method of any of clauses 1-6, the perturbation is determined using a gradient-free optimization technique.

Clause 8: In some examples of the computer-implemented method of any of clauses 1-7, the method also includes interpreting output from the neural network using the negative rule.

Clause 9: In some examples of the computer-implemented method of any of clauses 1-8, the method also includes identifying the perturbation as a minimal perturbation to cause the neural network to return the second classification.

Clause 10: In some examples of the computer-implemented method of any of clauses 1-9, the method also includes providing subsequent modified training datasets that do not include features of the minimal perturbation to the neural network to test the negative rule.

Clause 11: In some examples of the computer-implemented method of clause 10, the method also includes confirming the negative rule in response to the testing the negative rule and determining that the negative rule holds across a statistically significant set of analyses of the neural network.

Clause 12: In some examples of the computer-implemented method of clause 10, the method also includes disproving the negative rule in response to the testing the negative rule and determining that the negative rule does not hold across a statistically significant set of analyses of the neural network.

Clause 13: In some examples of the computer-implemented method of clause 10, the method also includes modifying the negative rule in response to the testing the negative rule and determining that only some aspects of the negative rule hold across a statistically significant set of analyses of the neural network.

Clause 14: a system includes a processor and a memory in communication with the processor, the memory containing instructions that, when executed by the processor, cause the processor to execute the method of clauses 1-13.

Clause 15: In some examples a computer program product including a computer readable storage medium having program instructions embodied therewith, the program instructions executable by a computer to cause the computer to execute the method of clauses 1-13.

What is claimed is:

1. A computer-implemented method comprising:
receiving a first classification from a neural network regarding a training dataset sent to the neural network, wherein the neural network is configured to identify positive and negative evidence;
identifying a modified training dataset with a perturbation of the training dataset that causes the neural network to return a second classification that is different from the first classification; and
analyzing the perturbation to identify a negative rule of the neural network, wherein the negative rule relates to an absence of an element in an input of the training dataset increasing a likelihood that the neural network returns the first classification, wherein a presence of the element increases a likelihood that the neural network returns the second classification.

2. The computer-implemented method of claim 1, wherein analyzing the perturbation to identify the negative rule of the neural network includes identifying features that are present in the modified training dataset that are not in the training dataset.

3. The computer-implemented method of claim 2, wherein analyzing the perturbation to identify the negative rule of the neural network includes identifying that some of the features that are not in the training dataset are more relevant to the training dataset.

4. The computer-implemented method of claim 3, wherein identifying that some of the features that are not in the training dataset are more relevant includes using term frequency inverse document frequency.

5. The computer-implemented method of claim 1, wherein analyzing the perturbation to identify the negative rule of the neural network includes identifying features of the training dataset that were most impacted by the perturbation.

6. The computer-implemented method of claim 1, wherein the perturbation is determined using an adversarial attack method.

7. The computer-implemented method of claim 1, wherein the perturbation is determined using a gradient-free optimization technique.

8. The computer-implemented method of claim 1, further comprising interpreting output from the neural network using the negative rule.

9. The computer-implemented method of claim 1, further comprising identifying the perturbation as a minimal perturbation to cause the neural network to return the second classification.

10. A system comprising:
a processor; and
a memory in communication with the processor, the memory containing instructions that, when executed by the processor, cause the processor to:
receive a first classification from a neural network regarding a training dataset sent to the neural network, wherein the neural network is configured to identify positive and negative evidence;
identify a modified training dataset with a perturbation of the training dataset that causes the neural network to return a second classification that is different from the first classification; and
analyze the perturbation to identify a negative rule of the neural network, wherein the negative rule relates to an absence of an element in an input of the training dataset increasing a likelihood that the neural network returns the first classification, wherein a presence of the element increases a likelihood that the neural network returns the second classification.

11. The system of claim 10, wherein analyzing the perturbation to identify the negative rule of the neural network includes identifying features that are present in the modified training dataset that are not in the training dataset.

12. The system of claim 11, wherein analyzing the perturbation to identify the negative rule of the neural network includes identifying that some of the features that are not in the training dataset are more relevant to the training dataset using term frequency inverse document frequency.

13. The system of claim 10, wherein analyzing the perturbation to identify the negative rule of the neural network includes identifying features of the training dataset that were most impacted by the perturbation to create the modified training dataset.

14. The system of claim 10, wherein the perturbation is determined using an adversarial attack method.

15. The system of claim 10, the memory containing additional instructions that, when executed by the processor, cause the processor to interpret output from the neural network using the negative rule.

16. A computer program product, the computer program product comprising a computer readable storage medium having program instructions embodied therewith, the program instructions executable by a computer to cause the computer to:
receive a first classification from a neural network regarding a training dataset sent to the neural network, wherein the neural network is configured to identify positive and negative evidence;
identify a modified training dataset with a perturbation of the training dataset that causes the neural network to return a second classification that is different from the first classification; and
analyze the perturbation to identify a negative rule of the neural network, wherein the negative rule relates to an absence of an element in an input of the training dataset increasing a likelihood that the neural network returns the first classification, wherein a presence of the element increases a likelihood that the neural network returns the second classification.

17. The computer program product of claim 16, wherein analyzing the perturbation to identify the negative rule of the neural network includes at least one of:
identifying features that are present in the modified training dataset that are not in the training dataset; and
identifying that some of the features that are not in the training dataset are more relevant to the training dataset using term frequency inverse document frequency.

18. The computer program product of claim 16, wherein analyzing the perturbation to identify the negative rule of the neural network includes identifying features of the training dataset that were most impacted by the perturbation to create the modified training dataset.

19. The computer program product of claim 16, wherein the perturbation is determined using an adversarial attack method.

20. The computer program product of claim 16, the computer readable storage medium having additional program instructions embodied therewith that are executable by the computer to cause the computer to interpret output from the neural network using the negative rule.

* * * * *